United States Patent [19]

Dovan et al.

[11] Patent Number: 5,617,920
[45] Date of Patent: Apr. 8, 1997

[54] METHOD FOR MODIFYING GELATION TIME OF ORGANICALLY CROSSLINKED, AQUEOUS GELS

[75] Inventors: Hoai T. Dovan, Yorba Linda; Burton B. Sandiford, Balboa Island; Richard D. Hutchins, Placentia, all of Calif.

[73] Assignee: Union Oil Company of California, El Segundo, Calif.

[21] Appl. No.: 361,431

[22] Filed: Dec. 21, 1994

Related U.S. Application Data

[60] Continuation-in-part of Ser. No. 119,715, Sep. 10, 1993, Pat. No. 5,486,312, which is a division of Ser. No. 940,301, Aug. 31, 1992, Pat. No. 5,246,073.

[51] Int. Cl.$^6$ ............................. F21B 33/13; B01J 13/00
[52] U.S. Cl. .................. 166/295; 166/300; 252/315.1; 405/270; 507/222; 507/903; 523/130; 524/916; 588/255
[58] Field of Search .................. 252/315.1; 507/222, 507/903; 166/270, 295, 300, 309; 523/130; 524/916; 526/307; 405/264; 270; 588/255

[56] References Cited

U.S. PATENT DOCUMENTS

| | | | |
|---|---|---|---|
| 3,306,870 | 2/1967 | Eilers et al. | 524/413 |
| 3,511,789 | 5/1970 | Shannon et al. | 528/129 X |
| 3,929,695 | 12/1975 | Murata et al. | 528/129 X |
| 3,959,569 | 5/1976 | Burkholder, Jr. | 428/475 |
| 4,103,742 | 8/1978 | Swanson | 166/282 |
| 4,137,182 | 1/1979 | Golinkin | 252/8.55 |
| 4,155,405 | 5/1979 | Vio | 166/295 |
| 4,246,124 | 1/1981 | Swanson | 252/8.551 |
| 4,291,069 | 9/1981 | Pilny | 427/140 |
| 4,300,634 | 11/1981 | Clampitt | 166/295 X |
| 4,366,194 | 12/1982 | Pilny et al. | 427/385.5 |
| 4,389,320 | 6/1983 | Clampitt | 252/8.551 |
| 4,413,680 | 11/1983 | Sandiford et al. | 166/270 |
| 4,428,432 | 1/1984 | Pabley | 166/302 |
| 4,440,228 | 4/1984 | Swanson | 166/274 |
| 4,456,400 | 6/1984 | Heide et al. | 405/270 X |
| 4,498,540 | 2/1985 | Marrocco | 166/295 |
| 4,514,309 | 4/1985 | Wadhwa | 252/8.55 |
| 4,534,412 | 8/1985 | Dovan et al. | 166/295 |
| 4,553,601 | 11/1985 | Almond et al. | 166/308 |
| 4,579,670 | 4/1986 | Payne | 252/8.551 |
| 4,606,772 | 8/1986 | Almond et al. | 252/329.4 |
| 4,619,776 | 10/1986 | Mondshine | 252/8.551 |
| 4,654,132 | 3/1987 | Takagi et al. | 204/182.8 |
| 4,673,038 | 6/1987 | Sandiford et al. | 166/270 |
| 4,694,906 | 9/1987 | Hutchins et al. | 166/294 |
| 4,776,398 | 10/1988 | Chu et al. | 166/274 |
| 4,779,680 | 10/1988 | Sydansk | 252/8.551 |
| 4,783,492 | 11/1988 | Dovan et al. | 523/130 |
| 4,801,389 | 1/1989 | Brannon et al. | 252/8.551 |
| 4,811,787 | 3/1989 | Navratil et al. | 166/273 |
| 4,896,723 | 1/1990 | Hoskin et al. | 166/276 |
| 4,903,767 | 2/1990 | Shu et al. | 166/270 |
| 4,907,656 | 3/1990 | Sanchez et al. | 166/270 |
| 4,926,943 | 5/1990 | Hoskin | 166/270 |
| 4,928,766 | 5/1990 | Hoskin | 166/270 |
| 4,942,217 | 7/1990 | Gardziella et al. | 528/129 |
| 5,061,387 | 10/1991 | Victorius | 252/8.554 |
| 5,071,890 | 12/1991 | Shu et al. | 523/130 |
| 5,079,278 | 1/1992 | Mitchell | 523/130 |
| 5,145,012 | 9/1992 | Hutchins et al. | 166/292 |
| 5,145,913 | 9/1992 | Gerber | 528/129 X |
| 5,160,445 | 11/1992 | Sharif | 252/8.551 |
| 5,211,858 | 5/1993 | Dovan et al. | 252/8.551 |
| 5,246,073 | 9/1993 | Sandiford et al. | 166/295 |
| 5,268,112 | 12/1993 | Hutchins et al. | 252/8.551 |
| 5,291,949 | 3/1994 | Dovan et al. | 166/295 |
| 5,423,380 | 6/1995 | Johnston et al. | 166/295 |
| 5,486,312 | 1/1996 | Sandiford et al. | 252/315.1 |

FOREIGN PATENT DOCUMENTS

| | | |
|---|---|---|
| 0139471 | 5/1985 | European Pat. Off. |
| 0447967 | 3/1991 | European Pat. Off. |
| 0446865 | 3/1991 | European Pat. Off. |
| 0544377 | 6/1993 | European Pat. Off. |
| 9500742 | 1/1995 | WIPO |

OTHER PUBLICATIONS

SPE 11787.
SPE/DOE 17329.
SPE 18500.
SPE/DOE 20214.

*Primary Examiner*—Richard D. Lovering
*Attorney, Agent, or Firm*—Gregory F. Wirzbicki; Shlomo R. Frieman

[57] ABSTRACT

Enhanced gel properties (e.g., faster gel time, higher attainable gel strengths) are achieved by reducing the pH and/or increasing the salt of a monovalent and/or divalent cation concentration of an aqueous reaction medium in which a polymer is reacted with an organic crosslinking agent. In addition, the gelation time of an aqueous composition comprising a polymer and an organic crosslinking agent is reduced by heating the composition above about 48.9° C. (120° F.) prior to injecting the composition into a subterranean formation. Alternatively, the gelation time of the aqueous composition is increased by incorporating a pH increasing agent into the composition.

40 Claims, No Drawings

METHOD FOR MODIFYING GELATION TIME OF ORGANICALLY CROSSLINKED, AQUEOUS GELS

CROSS-REFERENCES TO RELATED APPLICATIONS

This application is a continuation-in-part of application Ser. No. 08/119,715, filed Sep. 10, 1993, now U.S. Pat. No. 5,486,312 which is a division of application Ser. No. 07/940,301, filed Aug. 31, 1992, now U.S. Pat. No. 5,246,073, which applications are incorporated in their entireties by reference.

BACKGROUND

The present invention relates to (a) methods for modifying the gelation time of organically crosslinked, aqueous gels, (b) gels formed by the foregoing methods, (c) compositions for forming the gels, and (d) subterranean formations containing the gels.

Gels are used for several purposes in connection with the production of a natural resource (e.g., oil, natural gas, and geothermal fluids) from subterranean formations. For example, gels are employed (a) to reduce the water/natural gas production ratio, (b) to reduce the water/oil production ratio, (c) to plug off water producing zones within a subterranean formation, and (d) to conform the fluid permeability across the face of a subterranean formation.

In addition, gels can be used to contain migrating, hazardous wastes in the subsurface.

An important factor in forming these gels is the time it takes for a gelable, polymer-containing composition to gel. In some environments (e.g., low temperature oil-producing reservoirs), the gelation time is too long, requiring extended shut in periods to allow complete gelation of the composition and to prevent the flow of uncrosslinked polymer back into a wellbore.

In other environments, the gelation time is too short. In this latter case, the rapid formation of the gel impedes the satisfactory distribution of the gelable composition prior to gelation.

Accordingly, there is a need to modify the gelation time of a gelable composition in order to form a gel in a satisfactory time frame.

SUMMARY OF THE INVENTION

The present invention satisfies this need by providing compositions having variable gelation times. More specifically, the compositions of the present invention comprise (A) an ingredient selected from the group consisting of water soluble, crosslinkable polymers and polymerizable monomers capable of forming a crosslinkable polymer; (B) an organic crosslinking agent; (C) water; and (D) a gelation time modifying agent selected from the group consisting of salts of monovalent and divalent cations, pH modifying agents, and mixtures thereof. pH modifying agents which reduce the pH of the composition (hereinafter referred to as "pH reducing agents") as well as salts of monovalent and divalent cations shorten the gelation time of the composition, while pH modifying agents which increase the pH of the composition (hereinafter referred to as "pH increasing agents") lengthen the gelation time of the composition.

The present invention also provides methods for forming a gel in a subterranean formation and recovery systems formed thereby. In one version, the gel is formed in a subterranean formation by injecting one of the foregoing compositions into at least a portion of the subterranean formation. In another version, the ingredients which form the composition are distributed between two slugs (e.g., one slug comprising (A) water, (B) the water soluble, crosslinkable polymers and/or polymerizable monomers, and (C) the gelation time modifying agent and the other slug comprising the crosslinking agent), with each slug being injected, either simultaneously or sequentially, into at least a portion of the subterranean formation. In an alternative version, a composition comprising (A) water, (B) the water soluble, crosslinkable polymers and/or polymerizable monomers, and (C) the crosslinking agent (but substantially devoid of any gelation time modifying agent) is heated at the surface to at least about 48.9° C. (120° F.) and then injected into the subterranean formation.

The recovery system comprises a subterranean formation, a well penetrating at least a portion of the subterranean formation, and a gel present in at least a portion of the subterranean formation, the gel being formed by any of the methods described in the preceding paragraph.

DETAILED DESCRIPTION OF THE INVENTION

The gelation time of an organically crosslinked, aqueous gel is modified by incorporating a gelation time modifying agent into a composition used to form the gel. The gelation time modifying agent is selected from the group consisting of pH modifying agents (more specifically, pH reducing agents and pH increasing agents), salts of monovalent and divalent cations, and mixtures thereof. The pH reducing agents are selected from the group consisting of acids, acid precursors, buffers having a buffering capacity at or below about pH 6.5, and mixtures thereof. Acids include, but are not limited to, the organic and inorganic acids listed in the Handbook of Chemistry and Physics, 65th Edition, Weast, Editor-in-Chief, CRC Press, Inc. Boca Raton, Fla. (1984) on pages D-165 to D-167 (hereinafter referred to as the "Handbook"), the Handbook being incorporated herein in its entirety by reference. Preferred acids are sulfuric acid, hydrochloric acid, acetic acid, citric acid, and carbonic acid.

Typical classes of acid precursors include hydrolyzable esters, acid anhydrides, sulfonates, organic halides, acid salts (e.g., ammonium citrate and ammonium acetate), acid gases (e.g., carbon dioxide, hydrogen sulfide, and sulfur dioxide), and salts of a strong acid and a weak base (e.g., ammonium chloride, ammonium sulfate, ammonium nitrate, and ammonium phosphate). Exemplary specific acid precursors are ethyl formate, propyl formate, ethyl acetate, glycerol monoacetate, acetin, glycerol diacetate, diacetin, xanthanes, thiocyanates, polyethylene esters, ethyl acetate esters, acrylate copolymers, and dimethyl esters. Ethyl formate, propyl formate, ethyl acetate, dibasic esters, ammonium acetate, ammonium citrate, carbon dioxide, and their mixtures are the preferred acid precursors.

Buffers having a buffering capacity at or below about pH 6.5 include, but are not limited to, potassium tartrate, potassium tetroxalate, and potassium phthalates.

All other things being equal, the lower the pH of a gel-forming composition of the present invention, the shorter the gelation time. Accordingly, in those instances where it is desired to obtain short gelation times, the pH of the gel-forming composition is typically about 6.5 or less, more typically about 6 or less, even more typically about 5.5 or less, and most typically about 5 or less. Preferably, in such instances, the gel-forming composition has a pH of about 4.5 or less, more preferably about 4 or less, even more preferably about 3.5 or less, and most preferably about 3 or less. Even lower pH's (e.g., about 2.5, 2, 1.5, 1 or less) are also very desirable.

Regarding salts of monovalent and divalent cations, when all other parameters are held constant, the higher the cation concentration in the gel-forming composition, the shorter the gelation time for a given gel-forming composition. In addition, when all other parameters are held constant, an incremental increase in the concentration of a divalent cation is more effective for decreasing the gelation time of a gel-forming composition than a corresponding incremental increase in the concentration of a monovalent cation in the gel-forming composition. Accordingly, when a salt of a monovalent cation is used, the amount added (up to the saturation point of the composition) is typically about 1 or more, more typically about 2 or more, preferably about 3 or more, more preferably about 4 or more, and most preferably about 5 or more, weight percent. (To determine the amount of salt to add to form a composition of the present invention, multiply the desired weight percent of salt to be added by the weight of all ingredients in the final composition. As used in the specification and claims, the term "is added" or "adding" or similar language in reference to using a salt of a monovalent and/or divalent cation in formulating the compositions of the present invention means introducing either a solid salt or a salt-containing first liquid (usually a solution) into a second liquid where the first liquid has a higher ionic strength than the second liquid.) Commonly, the amount of salt of a monovalent cation added is about 10 or less, more commonly about 9 or less, even more commonly about 8 or less, and most commonly about 7 or less, weight percent.

Concerning the amount of salt of a divalent cation used in formulating the gel-forming composition, frequently about 0.15 or more, more frequently about 0.5 or more, even more frequently about 0.75 or more, and most frequently about 1 or more, weight percent is added (up to the saturation point of the composition). Preferably, the amount of salt of a divalent cation added in formulating the composition is about 1.5 or more, more preferably about 2 or more, even more preferably about 2.5 or more, and most preferably about 3 or more, weight percent. Typically, the amount of salt of a divalent cation added is about 9 or less, more typically about 8 or less, even more typically about 7 or less, and most typically about 6 or less, weight percent.

With respect to pH increasing agents, exemplary pH increasing agents include bases (e.g., sodium hydroxide), buffering agents having a buffering capacity above about pH 7, and base precursors (e.g., quaternary ammonium salts, urea, substituted ureas, coordinated compounds, salts of a strong base and a weak acid, and basic gases (e.g., ammonia, methylamine, and ethylamine), with the preferred base precursors being urea, thiourea, and mixtures thereof).

All other things being equal, the higher the pH of a gel-forming composition of the present invention, the longer the gelation time. Thus, in those instances where it is desired to obtain longer gelation times, the amount of pH increasing agent used is commonly sufficient for the composition to have a pH of at least about 7, more commonly at least about 7.5, even more commonly at least about 8, and most commonly at least about 8.5. Preferably, the composition comprises a sufficient amount of the pH increasing agent for the composition to have a pH of at least about 9, more preferably at least about 9.5, even more preferably at least about 10, and most preferably at least about 10.5.

Other gel-forming ingredients include organic crosslinking agents and crosslinkable polymers and/or monomers capable of polymerizing to form a crosslinkable polymer. The organic crosslinking agents are well known to those skilled in the art. Exemplary organic crosslinking agents include, but are not limited to, aldehydes, dialdehydes, phenols, substituted phenols, and ethers. Phenol, resorcinol, catechol, phloroglucinol, gallic acid, pyrogallol, 4,4'-diphenol, 1,3-dihydroxynaphthalene, 1,4-benzoquinone, hydroquinone, quinhydrone, tannin, phenyl acetate, phenyl benzoate, 1-naphthyl acetate, 2-naphthyl acetate, phenyl chloroacetate, hydroxyphenylalkanols, formaldehyde, paraformaldehyde, acetaldehyde, propionaldehyde, butyraldehyde, isobutyraldehyde, valeraldehyde, heptaldehyde, decanal, glyoxal, glutaraldehyde, terephthaldehyde, hexamethylenetetramine, trioxane, tetraoxane, polyoxymethylene, and divinylether are some of the more typical organic crosslinking agents. Individual or mixtures of crosslinking agents are used in the present invention.

With respect to the crosslinkable polymers, these polymers are typically water soluble. Common classes of water soluble, crosslinkable polymers include polyvinyl polymers, polyacrylic polymers, polyoxide polymers, polymethacrylamides, cellulose ethers, polysaccharides, lignosulfonates, ammonium salts thereof, alkali metal salts thereof, as well as alkaline earth salts of lignosulfonates. Specific examples of typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinyl acetate, partially hydrolyzed polyvinyl acetate, polyalkyleneoxides, carboxycelluloses, carboxyalkylhydroxyethyl celluloses, hydroxyethylcellulose, galactomannans (e.g., guar gum), substituted galactomannans (e.g., hydroxypropyl guar), heteropolysaccharides obtained by the fermentation of starch-derived sugar (e.g., xanthan gum), and ammonium and alkali metal salts thereof. Preferred water soluble, crosslinkable polymers include hydroxypropyl guar, copolymers of acrylic acid and acrylamide, unhydrolyzed polyacrylamides, partially hydrolyzed polyacrylamides, cationic polyacrylamides, cationic denaturated polyacrylamides, xanthan gum, polyvinyl alcohol, partially hydrolyzed polyvinyl acetate, and the ammonium and alkali metal salts thereof.

One class of cationic polyacrylamides useful as the crosslinkable polymer comprises an (i) acrylamide unit having the formula I.

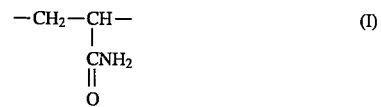

and (ii) a cationic unit having the formula II

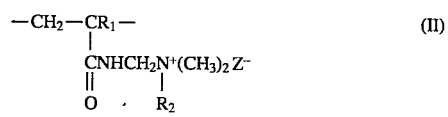

where Z is an anion and $R_1$ and $R_2$ are independently selected from the group consisting of hydrogen and alkyl groups containing 1 to 10 carbon atoms. In this exemplary cationic polyacrylamide, the mole fraction of acrylamide units of formula I is typically less than about 0.5, more typically about 0.4 or less, and preferably about 0.3 or less, more preferably about 0.2 or less, and even more preferably about 0.1 or less, and most preferably 0, and the mole fraction of cationic units of formula II present in the polymer is commonly at least 0.5, more commonly about 0.6 or more, and preferably about 0.7 or more, more preferably about 0.8 or more, even more preferably about 0.9 or more, and most preferably about 1, provided that the total sum of these mole fractions is 1. (When the mole fraction of cationic units of formula II in the polymer is 1, the polymer is a cationic denatured polyacrylamide.) Preferably, the number of carbon atoms in the alkyl group is 1 to about 5, more preferably 1 to about 3, even more preferably 1 to about 2, and most preferably 1. In addition, the polymer can be a random, block, or alternating polymer.

The crosslinkable polymers are generally available in several forms such as a water solution or broth, a gel log solution, a dried powder, and a hydrocarbon emulsion or dispersion. As is well known to those skilled in the art, different types of equipment are employed to handle these different forms of crosslinkable polymers.

Monomers capable of polymerizing to form a crosslinkable polymer include, but are not limited to, acrylamide, vinyl acetate, acrylic acid, methacrylamide, ethylene oxide, propylene oxide, and cationic monomers which, when polymerized, yield the cationic units of above formula II.

Optionally, chelating agents and/or surfactants are employed in practicing the present invention. Exemplary types of chelating agents include, but are not limited to, polyphosphates (e.g., sodium tripolyphosphate, hexametaphosphoric acid), aminocarboxylic acids (e.g., ethylenediaminetetraacetic acid (EDTA), N-(hydroxyethyl) ethylenediaminetetraacetic acid (HEDTA), nitrilotriacetic acid (NTA), diethylenetriaminepentaacetic acid (DTPA)), N-dihydroxyethylglycine, ethylenebis(hydroxyphenylglycine), 1,3-diketones (e.g., acetylacetone, trifluoroacetylacetone, thenoyltrifluoroacetone), hydroxycarboxylic acids (e.g., tartaric acid, citric acid, gluconic acid, 5-sulfosalicylic acid), polyamines (e.g., ethylenediamine, triethylenetetramine, triaminotriethylamine), aminoalcohols (e.g., triethanolamine, N-hydroxyethylethylenediamine), aromatic heterocyclic bases (e.g., dipyridyl, o-phenanthroline), phenols (e.g., salicylaldehyde, disulfopyrocatechol, chromotropic acid), aminophenols (e.g., oxine, 8-hydroxyquinoline, oxinesulfonic acid), oximes (e.g., dimethylglyoxime, salicylaldoxime), Shiff bases (e.g., disalicylaldehyde 1,2-propylenediimine), tetrapyrroles (e.g., tetraphenylporphin, phthalocyanine), sulfur compounds (e.g., toluenedithiol, dimercaptopropanol, thioglycolic acid, potassium ethyl xanthate, sodium diethyldithiocarbamate, dithizone, diethyl dithiophosphoric acid, thiourea), polymeric (e.g., polyethylenimine, polymethacryloylacetone, poly(p-vinylbenzyliminodiacetic acid)), and phosphonic acids (e.g., nitrilomethylenephosphonic acid, ethylenediaminetetra(methylenephosphonic acid), hydroxyethylidenediphosphonic acid).

Regarding surfactants, preferred surfactants are water-soluble and have sufficient foaming ability to enable the composition, when traversed by a gas, to foam and, upon curing, form a foamed gel. Non-limiting examples of the preferred surfactants are those which, when incorporated into water in a concentration of about 5 weight percent (based on the total weight of water and surfactant), meet the following described test. The surfactant is dissolved in water and about 500 ml of the resulting solution is placed in a graduated cylinder to form a column having a height of about 50 cm. Natural gas is passed into the bottom of the column through a fritted glass disc at substantially atmospheric pressure so that the gas bubbles through the column of liquid and passes out the top of the cylinder. The gas rate is maintained at about 500 ml gas per minute per square inch of column cross-sectional area, and the flow of the gas is continued for a period of about 15 minutes. The preferred surfactants produce a column of foam at least about 180 cm in height under these conditions at the top of the column of water.

Exemplary surfactants include, but are not limited to, alkyl polyethylene oxide sulfates (e.g., Alipal CD 128 brand surfactant), alkyl alkylolamine sulfates, modified ether alcohol sulfate sodium salt, sodium lauryl sulfate, perfluoroalkanoic acids and salts having about 3 to about 24 carbon atoms per molecule (e.g., perfluorooctanoic acid, perfluoropropanoic acid, and perfluorononanoic acid), modified fatty alkylolamides, polyoxyethylene alkyl aryl ethers, octylphenoxyethanol, ethanolated alkyl guanidine-amine complexes, condensation of hydrogenated tallow amide and ethylene oxide, ethylene cyclomido 1-lauryl, 2-hydroxy, ethylene sodium alcoholate, methylene sodium carboxylate, alkyl arylsulfonates, sodium alkyl naphthalene sulfonate, sodium hydrocarbon sulfonates, petroleum sulfonates, sodium linear alkyl aryl sulfonates, alpha olefin sulfonates, condensation product of propylene oxide with ethylene oxide, sodium salt of sulfated fatty alcohols, octylphenoxy polyethoxy ethanol, sorbitan monolaurate, sorbitan monopalmitate, sorbitan trioleate, polyoxyethylene sorbitan tristearate, polyoxyethylene sorbitan tristearate, polyoxyethylene sorbitan monooleate, dioctyl sodium sulfosuccinate, modified phthalic glycerol alkyl resin, octylphenoxy polyethoxy ethanol, acetylphenoxy polyethoxy ethanol, dimethyl didodecenyl ammonium chloride, methyl trioctenyl ammonium iodide, trimethyl decenyl ammonium chloride, dibutyl dihexadecenyl ammonium chloride, and water-soluble salts of esters of $C_3$ to $C_6$ sulfodicarboxylic acids having the general formula III

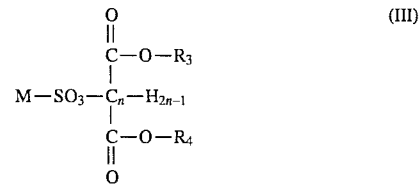

where M is selected from the group consisting of alkali metals, ammonium, and substituted ammonium; $R_3$ and $R_4$ are each independently an alkyl group containing about 3 to about 16 carbon atoms, and n is an integer from 1 to about 4.

In general, the gel-forming compositions are formed by mixing the polymer, the crosslinking agent, the gelation time modifying agent, and, optionally, the chelating agent and/or the surfactant. As known to those skilled in the art, the exact polymer and crosslinking agent concentrations are selected to assure (a) gel stability at reservoir (i.e., subterranean) conditions and (b) a suitable time frame for injecting the composition prior to gelation. The polymer is generally employed in a concentration of about 0.05 to about 50 weight percent, with polymer concentrations of about 0.1 to about 10 weight percent being preferred, about 0.2 to about 5 weight percent being more preferred, and about 0.25 to about 2.5 weight percent being most preferred. (Unless otherwise indicated, as used in the specification and claims, the term "weight percent" means the weight of a particular ingredient (e.g., polymer, crosslinking agent, gelation time modify agent, chelating agent, or surfactant) divided by the total weight of all ingredients present in the gel-forming composition.) Typically, the crosslinking agent is employed in a concentration of about 0.001 to about 5, preferably about 0.005 to about 2, more preferably about 0.0075 to about 1, and most preferably about 0.01 to about 0.5, weight percent.

With respect to the chelating agent, the chelating agent is generally employed in the composition in a concentration of at least about 0.75 mole per mole of dissolved divalent cations dissolved in either the aqueous phase of the composition or in the water located in the subterranean formation where the gel will be formed, whichever is greater. Preferably, the ratio of the moles of the chelating agent employed in the gel-forming composition to the moles of the dissolved divalent cation is about 0.75:1 to about 10:1, more preferably about 0.8:1 to about 5:1, even more preferably about 0.9:1 to about 2:1, and most preferably about 0.9:1 to about 1.5:1. While a ratio of about 10 moles chelating agent per mole dissolved divalent cation can be employed in the invention, there does not appear to be any significant advantage to employing a ratio greater than about 1:1.

In some cases (e.g., when phenolic chelating agents are employed), the chelating agent is capable of also functioning as a crosslinking agent. If no other crosslinking agent is present, the concentration of the dual acting substance falls within a range equal to the sum of the above-stated concentration ranges for the crosslinking agent and chelating agent. However, when a crosslinking agent is present that is not a chelating agent, the crosslinking agent is preferably present in the above-described crosslinking agent concentration ranges, and the dual acting chelating agent is preferably present in the above-noted chelating agent concentration ranges. In those instances where a crosslinking agent is present in a concentration less than about 0.001 weight percent, then the concentration of the dual acting chelating agent in the gel-forming composition is preferably at least about 1 mole per mole of divalent cations dissolved in the water employed in making the composition.

When employed, the surfactant is typically used in a concentration up to about 10, preferably about 0.01 to about 5, more preferably about 0.05 to about 3, and most preferably about 0.1 to about 2 weight percent.

When separate slugs of the crosslinkable polymer, the crosslinking agent, the chelating agent, the gelation time modifying agent, and/or the surfactant are injected into the subterranean formation, the amount of each of these injected ingredients is generally sufficient for their respective concentrations in the combined weight of the injected slugs (including the weight of any intervening spacer slugs) to fall within the above-stated concentration ranges.

While the separate slugs are injectable in any order, it is preferred that a slug containing the polymer, the gelation time modifying agent, and water (and, optionally, the chelating and/or the surfactant) be injected prior to injecting a crosslinking agent-containing slug. In addition, each slug is injectable as a single unit or injectable as a plurality of miniunits having substantially the same make-up.

Furthermore, it is preferred to inject a preflush fluid prior to injecting the slug or slugs that constitute the gel-forming composition. The volume of preflush fluid injected is generally about 5 to about 10 volume percent of the total volume of injected material constituting the gel-forming composition. The preflush fluid typically comprises a crosslinking agent and water, the concentration of the crosslinking agent in the preflush fluid being roughly about double the concentration of the crosslinking agent in the gel-forming composition. Optionally, the preflush fluid also contains a chelating agent. When employed, the concentration of the chelating agent in the preflush fluid is approximately the same as the concentration of the chelating agent in the gel-forming composition. (The preflush fluid is not considered part of the gel-forming composition and is, therefore, not included in calculating the volume of material which constitutes the gel-forming composition. Similarly, the amount of each ingredient (e.g., crosslinking agent and chelating agent) present in the preflush fluid is not included in calculating the concentration of the respective ingredient in the gel-forming composition.)

When a surfactant is employed in the process of the present invention, one or more slugs of a gas are usually also injected into the subterranean formation. While the gas slugs are injectable before, during, or after the injection of the gel-forming composition or separate slugs constituting the gel-forming composition, it is preferred to inject at least some, and more preferentially all, of the gas slugs after or simultaneously during the injection of the composition. Also preferred is the alternate, sequential injection of one or more slugs of the gel-forming composition and one or more slugs of the gas. The gas slugs are injected into the composition during the gelation period and before the composition has formed a gel incapable of being penetrated by the gas at normal gas injection pressures. (Normal gas injection pressures are injection pressures less than the formation fracturing pressure.) The gas slugs foam the surfactant-containing composition so that a foamed gel is produced.

The amount of gas injected (when measured at the temperature and pressure conditions in the subterranean formation being treated) is generally about 1 to about 99 volume percent based upon the total volume of treatment fluids injected into the subterranean formation (i.e., the sum of the volume of injected gas plus the volume of injected, foamable, gel-forming composition). Preferably, the amount of gas injected is about 20 to about 98, and more preferably about 40 to about 95, volume percent based upon the total volume of injected treatment fluids.

The injected gas is usually a noncondensable gas. Exemplary noncondensable gases include air, oxygen, hydrogen, noble gases (helium, neon, argon, krypton, xenon, and radon), natural gas, hydrocarbon gases (e.g., methane, ethane), nitrogen, and carbon dioxide. Air, nitrogen, and carbon dioxide are the more preferred noncondensable gases, with nitrogen being the most preferred.

One exemplary process for practicing the present invention is as follows. Before mixing any chemicals into the water employed in making the gel-forming composition, the water is generally filtered to prevent any suspended solids from damaging the formation by plugging the wellbore. Typically, the first chemicals added to the water are any required salts such as monovalent cations (e.g., potassium chloride), divalent cations (e.g., calcium chloride), and/or the chelating agent (e.g., EDTA). The potassium chloride is generally employed to prevent clay problems in the formation. Potassium chloride also helps to (a) stabilize the gel at low temperatures (e.g., at a temperature less than about 65.6° C. (150° F.)) and (b) reduce gelation time.

In order for the polymer to experience a high degree of turbulence during the initial mixing stage, solid polymers and liquid-based polymers are usually added to the water through an eductor or a positive displacement pump, respectively. The polymer and water are typically mixed in a mixing tank in small 1589.9 l (10 barrel) to 3974.7 l (25 barrel) batches. When desired, further mixing is achieved using either centrifugal pumps or other forms of agitation.

Frequently, the last chemicals added to the mixing tank are the crosslinking agent and the pH modifying agent. When used in a solid form, the crosslinking agent and the pH modifying agent are normally first dissolved in water in order for them to more readily mix with the contents of the mixing tank. This is especially important when the contents of the mixing tank are very viscous.

The gel-forming composition is obtained when all the desired ingredients have been mixed in the mixing tank. The resulting gel-forming composition is then often injected into the subterranean formation through either a production well or an injection well at a pressure below the fracture pressure of the formation. Depending on the injection capabilities of the well, the first slug of the gel-forming composition generally varies from about 7949.4 1 (50 barrels) to about 79494.1 1 (500 barrels).

The manner in which a non-foaming, gel-forming composition is injected into a well typically depends on whether the well penetrates a gas-producing formation or an oil-producing formation. In the case of an oil well, a single slug of the non-foaming, gel-forming composition is generally injected. In contrast, alternate slugs of the non-foaming, gel-forming composition are usually injected into a gas well, with the alternating slug commonly being a noncondensable gas.

When a foamed gel is desired, the surfactant is preferably added to the gel-forming composition "on the fly," i.e. as the composition is being injected into the subterranean formation. (Introducing the surfactant into the composition "on the fly" avoids foaming the composition in the mixing tank.) Next, the injection of the foamable gel-forming composition is stopped, and a noncondensable gas such as nitrogen is injected into the production well to foam the gel-forming composition. The volume of the nitrogen slug (based upon the temperature and pressure conditions within the formation being treated) is typically about 100 to about 1,000 percent of the volume of the previously injected slug of foamable gel-forming composition volume. The alternating slugs of foamable gel-forming composition and nitrogen are then repeated to achieve the desired penetration depth into the formation as well as the desired degree of foam quality. (The resulting foamed gel usually has a foam quality of at least about 50, preferably about 70 to about 99, more preferably about 80 to about 99, and most preferably about 90 to about 98, volume percent. As used in the specification and claims, the term "foam quality" means the volume of gas bubbles present in the foamed gel divided by the entire volume of the foamed gel.) The volume of the final nitrogen slug is preferably large enough to over-displace the wellbore of any foamable, gel-forming composition.

The gel-forming composition is displaced into the formation a sufficient distance so that at least a portion of the pore space in the formation, typically at least about 0.91 m (3 feet) from the production well or point of injection, is occupied by the composition. (When an oil well is being treated with a non-foaming, gel-forming composition, the composition is preferably displaced with an oil (e.g., crude oil, mineral oil, diesel oil, as well as oil produced from the subterranean formation being treated). When a water injection well is being treated, the composition is preferably displaced with water. In those instances where a gas well is being treated or where a foaming, gel-forming composition is being used, the composition is typically displaced into the formation with a noncondensable gas.) Preferably, the gel-forming composition occupies at least a portion of the pores located at least about 4.57 m (15 feet) from the well. More preferably, at least some of the pores located at least about 9.17 m (30 feet) from the production well contain the composition.

The well is then shut in for a sufficient period of time to allow the gel-forming composition within the pores of the subterranean formation to gel. Next, the well is slowly put back into service following the shut in period.

Accordingly, a gel or crosslinked polymer is generally formed by reacting or contacting proper proportions of (a) an organic crosslinking agent and (b) a crosslinkable polymer and/or polymerizable monomers capable of forming a crosslinkable polymer in the presence of (c) a gelation time modifying agent. As indicated above, the crosslinkable polymer or monomers capable of polymerizing to form a crosslinkable polymer and the crosslinking agent need not both be present in the gel-forming composition. When the crosslinkable polymer or crosslinking agent is omitted from the composition, the omitted material is usually introduced into the subterranean formation as a separate slug, either before, after, or simultaneously with the introduction of the gel-forming composition. Preferably, the composition comprises both (a) the crosslinking agent and (b) either (i) the crosslinkable polymer or (ii) the polymerizable monomers capable of forming a crosslinkable polymer.

Because of their stability in an acidic environment, the gels of this invention are especially well suited for use in a subterranean formation subjected to a carbon dioxide flooding operation. The gel can be formed in the subterranean formation either prior to or after the commencement of the carbon dioxide flood. When the gel is formed prior to the commencement of the carbon dioxide flood, a gelation time modifying agent which reduces the gelation time (i.e., a salt of a monovalent and/or divalent cation, a pH reducing agent, or mixtures thereof) is selected.

When formed after the commencement of the carbon dioxide flood, a gelation time modifying agent which increases the gelation time (i.e., a pH increasing agent) is employed to prevent premature gelling. (The pH increasing agent can either be incorporated into the composition or introduced into the subterranean formation in a separate slug injected ahead of the composition.) The reason for using a pH increasing agent is that a carbon dioxide flooded formation tends to be quite acidic and acidic environments tend to reduce the gelation time of the composition. However, even when the composition is intended for use in an acidic environment, the addition of a salt of a monovalent and/or divalent cation to the composition may still be desirable for the gels to exhibit increased gel strengths.

The compositions of the present invention are also useful for inhibiting the migration of a hazardous acid plume through a subterranean stratum of a landfill or natural subterranean formation. In one version, a pH increasing agent-containing composition is injected through one or more wellbores, e.g., observation wells, into the acid plume. Once in the acid plume, the pH increasing agent-containing composition commingles with the plume, with the resulting composition gelling as the pH of the composition falls. The migration of the acid plume is inhibited by the presence of the gel in the formation or stratum.

In another version, a composition of the present invention is injected through one or more wellbores into a subterranean region or stratum outside the acid plume but in the migration path of the plume. (Several wells can be used to construct a continuous gel barrier in the formation to prevent the migration of the acid plume.) In this instance, the composition generally comprises a gelation time reducing agent selected from the group consisting of salts of monovalent and divalent cations, pH reducing agents, and mixtures thereof.

Regardless whether the composition is injected into or outside the acid plume, the volume of the composition injected per wellbore depends on the number of wells and the volume and cross-sectional area of the plume intersecting the wellbore. In rough terms, about 15898.8 1 (100 barrels) to about 1589882 1 (10,000 barrels) of the composition are injected per well.

In another version, a composition comprising (A) water, (B) the water soluble, crosslinkable polymers and/or polymerizable monomers, and (C) the crosslinking agent (but substantially devoid of any gelation time modifying agent) is initially heated at the surface to between about 48.9° C. (120° F.) and about 100° C. (212° F.) and then injected into the subterranean formation. In this embodiment, the composition is commonly heated to at least about 54.4° C. (130° F.), more commonly to at least about 60° C. (140° F.), even more commonly to at least about 65.6° C. (150° F.), and most commonly to about 71.1° C. (160° F.). Preferably, the composition is heated to at least about 76.6° C. (170° F.), more preferably to at least about 82.2° C. (180° F.), even more preferably to at least about 87.8° C. (190° F.), and most preferably to about 93.3° C. (200° F.). In an alternative embodiment of this version, all ingredients except for the polymer and/or crosslinking agent are heated to the desired temperature and the omitted ingredient(s) is(are) added just prior to injecting the composition into the subterranean formation.

EXAMPLES

The following examples, which are intended to illustrate and not limit the invention, demonstrate the preparation of exemplary compositions and gels within the scope of invention, the stability of the gels when aged at preselected temperatures, and a comparison of such gels with other gels.

Mix Water Stock Solution

Calcium chloride (about 20 g) and sodium bicarbonate (about 2 g) were added to distilled water (about 78 g).

Bic Water Stock Solution

Sodium bicarbonate (about 2 g) was added to distilled water (about 98 g).

Using the above stock solutions, test samples were prepared and evaluated using the following protocol.

Test Sample

For each sample, the polymer and bic water stock solutions were added to a vial to achieve the concentrations shown below in Table A. Next, the mix water stock solution, when employed, was added to the vial in the amounts listed in Table A. Finally, the hydroquinone and hexamethylenetetramine stock solutions were added (using a micropipette) to the vial in amounts indicated in Table A. The vial was then capped and shaken.

TABLE A

Gel Formulations

| | Stock Solutions | | | | | Gel | | |
|---|---|---|---|---|---|---|---|---|
| Example | Polymer g | HQ[1] µL | HMT[2] µL | MW[3] g | BW[4] g | Polymer ppmw | HQ ppmw | HMT ppmw |
| 1 | 8.33 | 150 | 150 | 0 | 1.6 | 12,500 | 1,500 | 1,500 |
| 2 | 8.33 | 300 | 300 | 0 | 1.6 | 12,500 | 3,000 | 3,000 |
| 3 | 8.33 | 350 | 350 | 0 | 1.6 | 12,500 | 3,500 | 3,500 |
| 4 | 8.33 | 400 | 400 | 0 | 1.6 | 12,500 | 4,000 | 4,000 |
| 5 | 6.67 | 150 | 150 | 0 | 3.3 | 10,000 | 1,500 | 1,500 |
| 6 | 3.33 | 150 | 150 | 0 | 6.6 | 5,000 | 1,500 | 1,500 |
| 7 | 3.33 | 200 | 200 | 0 | 6.6 | 5,000 | 2,000 | 2,000 |
| 8 | 8.33 | 150 | 150 | 0.5 | 1.1 | 12,500 | 1,500 | 1,500 |
| 9 | 8.33 | 300 | 300 | 0.5 | 1.1 | 12,500 | 3,000 | 3,000 |
| 10 | 8.33 | 350 | 350 | 0.5 | 1.1 | 12,500 | 3,500 | 3,500 |
| 11 | 8.33 | 400 | 400 | 0.5 | 1.1 | 12,500 | 4,000 | 4,000 |
| 12 | 6.67 | 150 | 150 | 0.5 | 2.8 | 10,000 | 1,500 | 1,500 |
| 13 | 3.33 | 150 | 150 | 0.5 | 6.1 | 5,000 | 1,500 | 1,500 |
| 14 | 3.33 | 200 | 200 | 0.5 | 6.1 | 5,000 | 2,000 | 2,000 |

[1] HQ denotes hydroquinone.
[2] HMT denotes hexamethylenetetramine.
[3] MW denotes mix water.
[4] BW denotes bic water.

EXAMPLES 1–4

Stock solutions were prepared using the following protocol.

Allied Colloids 935 Brand Polymer Stock Solution

Sodium bicarbonate (about 6 g) and Allied Colloids 935 brand medium molecular weight, partially hydrolyzed (about 10 percent) polyacrylamide polymer (about 4.5 g) were added to seawater (about 289.5 g).

Hydroquinone Stock Solution

Hydroquinone was mixed with distilled water to form a 10 weight percent hydroquinone stock solution.

Hexamethylenetetramine Stock Solution

Hexamethylenetetramine was mixed with distilled water to form a 10 weight percent hexamethylenetetramine stock solution.

Test Procedure

Each of samples 1 to 14 were aged in an oven at a temperature of about 110° C. (230° F.). Each of the aged samples were rated using the gel rating key shown below in Table B.

TABLE B

Gel Rating Key

| 1 | No Gel |
|---|---|
| 2 | Slight Gel |
| 3 | Weak Gel |
| 4 | Elastic Gel |
| 5 | Strong Gel |
| n % | % Synersed (Separated) Water |
| T | Trace of Water |

The results of the aging tests are set forth in the following Table C.

TABLE C

| | Gel Ratings | | | | | | | | |
|---|---|---|---|---|---|---|---|---|---|
| | Hours | | | | | Days | | | |
| Ex | 1 | 2 | 3 | 4 | 5 | 1 | 2 | 3 | 7 |
| 1 | 2– | 2– | 2– | 2– | 2 | 4++ | 5– | 5/T | 5+/T |
| 2 | 2– | 2– | 2– | 2 | 2+ | 5++ | 5++ | 5++ | 5++/T |
| 3 | 2– | 2– | 2– | 2 | 3– | 5++ | 5++ | 5++ | 5++ |
| 4 | 2– | 2– | 2– | 2 | 3– | 5++ | 5++ | 5++ | 5++/T |
| 5 | 2– | 2– | 2– | 2 | 2– | 4++ | 5– | 4++ | 5– |
| 6 | 1+ | 1+ | 1+ | 1+ | 2– | 4 | 4+ | 4+ | 4+ |
| 7 | 1+ | 1+ | 1+ | 2– | 2– | 4+ | 4++ | 4++ | 4++ |
| 8 | 2– | 2– | 2 | 2 | 2 | 5+/T | 5+/T | 5++/T | 5++/T |
| 9 | 2– | 2– | 2 | 3– | 3 | 5++/T | 5++/T | 5+/T | 5+/T |
| 10 | 2– | 2– | 2 | 3+ | 4– | 5++ | 5+/T | 5+/T | 5+/T |
| 11 | 2– | 2– | 2 | 3+ | 4– | 5+/T | 5++/T | 5+/T | 5+/T |
| 12 | 2– | 2– | 2– | 2– | 2– | 5– | 5+ | 5+/T | 5+/T |
| 13 | 1+ | 1+ | 1+ | 1+ | 1+ | 4 | 4++ | 5– | 5–/T |
| 14 | 1+ | 1+ | 1+ | 1+ | 1+ | 4+ | 4++ | 5– | 5–/T |

The results listed above in Table C indicate that gels prepared with divalent calcium tend to gel faster.

EXAMPLES 15–22

Stock solutions were prepared using the following protocol.

Allied Colloid 935 Brand Polymer Stock Solution

Sodium bicarbonate (about 6 g) and Allied Colloids 935 brand medium molecular weight, partially hydrolyzed (about 10 percent) polyacrylamide polymer (about 4.5 g) were added to seawater (about 289.5 g).

SNF AN 905 BPM Brand Polymer Stock Solution

Sodium bicarbonate (about 6 g) and SNF AN 905 BPM brand partially hydrolyzed polyacrylamide polymer (about 4.5 g) were added to seawater (about 289.5 g).

Hydroquinone Stock Solution

Hydroquinone was mixed with distilled water to form a 10 weight percent hydroquinone stock solution.

Hexamethylenetetramine Stock Solution

Hexamethylenetetramine was mixed with distilled water to form a 10 weight percent hexamethylenetetramine stock solution.

Mix Water Stock Solution

Calcium chloride (about 20 g) and sodium bicarbonate (about 2 g) were added to distilled water (about 78 g).

Bic Water Stock Solution

Sodium bicarbonate (about 2 g) was added to distilled water (about 98 ).

Using the above stock solutions, test samples were prepared and evaluated using the following protocol.

Test Sample

For each sample, appropriate amounts of the polymer, bic water, and mix water stock solutions were added to a vial to achieve the concentrations shown below in Table D. Next, using a micropipette, the hydroquinone and hexamethylenetetramine stock solutions were added to the vial to achieve the concentrations indicated in Table D. Each vial (which contained about 10 g) was then capped and shaken.

Test Procedure

Each sample was aged in an oven at a temperature of about 54.4° C. (130° F.) and rated using the gel rating key set forth above in Table B. The results of the aging tests are set forth in the following Table D.

TABLE D

| | Gels Prepared In Seawater Containing 2 wt % Sodium Bicarbonate, Aged At 54.5° C. (130° F.) | | | | | | | | | | | | |
|---|---|---|---|---|---|---|---|---|---|---|---|---|---|
| | | ppmw | | | Gel Ratings, days | | | | | | | | |
| Ex | Polymer | HQ[1] | CaCl$_2$ | HMT[2] | 1 | 2 | 3 | 4 | 6 | 7 | 8 | 9 | 14 | 28 |
| 15 | A[3] | 7,500 | 2,500 | 1 | 5,000 | 2– | 2 | 3– | 4 | 5– | 5+ | NT[4] | NT | 5+/T | 5+/5% |
| 16 | A | 7,500 | 2,500 | 0 | 5,000 | 2– | 2 | 2 | 2+ | 2+ | 2+ | 3 | 4– | 5– | 5+/T |
| 17 | S[5] | 7,500 | 2,500 | 1 | 5,000 | 2 | 2 | 3 | 4+ | 4+ | 5 | NT | NT | 5+/T | 5+/T |
| 18 | S | 7,500 | 2,500 | 0 | 5,000 | 2– | 2 | 2+ | 2+ | 3– | 3– | 4– | 4– | 4++ | 5+/T |
| 19 | A | 10,000 | 2,500 | 1 | 5,000 | 2– | 2 | 3+ | 4++ | 5– | 5/T | NT | NT | 5+/5% | 5+/5% |
| 20 | A | 10,000 | 2,500 | 0 | 5,000 | 2 | 2 | 2 | 2 | 3– | 3 | 4– | 4 | 5 | 5+/5% |
| 21 | S | 10,000 | 2,500 | 1 | 5,000 | 2– | 2 | 4 | 4++ | 5 | 5+/T | NT | NT | 5+/T | 5+/T |
| 22 | S | 10,000 | 2,500 | 0 | 5,000 | 2 | 2 | 2+ | 3+ | 4– | 4 | 4 | 4+ | 5+ | 5+/5% |

[1] HQ denotes hydroquinone.
[2] HMT denotes hexamethylenetetramine.

TABLE D-continued

| | | Gels Prepared In Seawater Containing 2 wt % Sodium Bicarbonate, Aged At 54.5° C. (130° F.) | | | | | | | | | | | | |
|---|---|---|---|---|---|---|---|---|---|---|---|---|---|---|
| | | ppmw | | | Gel Ratings, days | | | | | | | | | |
| Ex | Polymer | HQ[1] | CaCl$_2$ | HMT[2] | 1 | 2 | 3 | 4 | 6 | 7 | 8 | 9 | 14 | 28 |

[3] "A" denotes Allied Colloids 935 brand polymer.
[4] NT denotes not taken.
[5] "S" denotes SNF AN 905 BPM brand polymer.

The results noted in the foregoing Table D also indicate that gels prepared with divalent calcium tend to exhibit faster gel times.

EXAMPLES 23–28

Stock solutions were prepared using the following protocol.

ORP-750 Brand Polymer Stock Solution

Sodium bicarbonate (about 6 g) and ORP-750 brand very high molecular weight, polyacrylamide polymer (about 4.5 g; available from Dai-Ichi Kogyo Seiyaku Co., Ltd. of Japan) were added to seawater (about 289.5 g).

Hydroquinone Stock Solution

Hydroquinone was mixed with distilled water to form a 10 weight percent hydroquinone stock solution.

Using the above stock solutions, test samples were prepared and evaluated using the following protocol.

Test Sample

For each sample, appropriate amounts of the polymer and the bic water stock solutions were added to a vial to achieve the concentrations shown below in Table E. Next, using a micropipette, the hydroquinone, hexamethylenetetramine, and calcium or magnesium chloride stock solutions were added to the vial in amounts indicated in Table E. Each vial was then capped and shaken.

Test Procedure

Each sample was aged in an oven at a temperature of about 87.8° C. (190° F.) and rated using the gel rating key shown above in Table B. The results of the aging tests are set forth in the following Table E.

TABLE E

| Gels Prepared In Seawater Containing 2 wt % Sodium Bicarbonate and 1 wt % ORP-750 Polymer, and Aged At 87.8° C. (190° F.) | | | | | | | | | | | | |
|---|---|---|---|---|---|---|---|---|---|---|---|---|
| | | | | | | Gel Ratings | | | | | | |
| | ppmw | | | | Hours | Days | | | | Weeks | | |
| Ex | HQ[1] | CaCl$_2$ | MgCl$_2$ | HMT[2] | 1 | 1 | 2 | 3 | 4 | 1 | 2 | 12 |
| 23 | 0 | 0 | 0 | 2,000 | 2+ | 4 | 4++ | 4++ | 5– | 4+ | 4+ | 4+ |
| 24 | 0 | 1 | 0 | 2,000 | 2+ | 5 | 5 | 5+ | 5+ | 5+ | 5+ | 5+ |
| 25 | 0 | 0 | 1 | 2,000 | 2+ | 4++ | 5– | 5+ | 5+ | 5+/T | 5+/T | 5+ |
| 26 | 500 | 0 | 0 | 2,000 | 2+ | 4++ | 5– | 5 | 5 | 5 | 5 | 5– |
| 27 | 500 | 1 | 0 | 2,000 | 2+ | 5– | 5 | 5 | 5 | 5 | 5+ | 5+/T |
| 28 | 500 | 0 | 1 | 2,000 | 2+ | 4+ | 5– | 5 | 5 | 5 | 5– | 5– |

[1] HQ denotes hydroquinone.
[2] HMT denotes hexamethylenetetramine.

Hexamethylenetetramine Stock Solution

Hexamethylenetetramine was mixed with distilled water to form a 10 weight percent hexamethylenetetramine stock solution.

Calcium Chloride Stock Solution

Calcium chloride (about 20 g) and sodium bicarbonate (about 2 g) were added to distilled water (about 78 g).

Magnesium Chloride Stock Solution

Magnesium chloride (about 20 g) and sodium bicarbonate (about 2 g) were added to distilled water (about 78 g).

Bic Water Stock Solution

Sodium bicarbonate (about 2 g) was added to distilled water (about 98 g).

The results set forth above in Table E indicate that gels prepared with divalent calcium or divalent magnesium exhibit both shorter gel times and higher gel ratings than gels prepared without these added cations.

EXAMPLES 29–40

Stock solutions were prepared using the following protocol.

ORP-750 Brand Polymer Stock Solution

Sodium bicarbonate (about 6 g) and Dai-Ichi Kogyo Seiyaku Co., Ltd. ORP-750 brand very high molecular weight, polyacrylamide polymer (about 3 g) were added to seawater or tapwater (about 291 g) and stirred at about 200 rpm until the polymer fully hydrated.

E-10 Polymer Stock Solution

Sodium bicarbonate (about 6 g) and Allied Colloids Percol E-10 brand high molecular weight, polyacrylamide polymer (about 3 g) were added to seawater or tapwater (about 291 g) and stirred at about 200 rpm until the polymer fully hydrated.

Hydroquinone Stock Solution

Hydroquinone was mixed with distilled water to form a 10 weight percent hydroquinone stock solution.

Hexamethylenetetramine Stock Solution

Hexamethylenetetramine was mixed with distilled water to form a 10 weight percent hexamethylenetetramine stock solution.

Sulfuric Acid Stock Solution

The sulfuric acid stock solution consisted of concentrated sulfuric acid, i.e., 100% $H_2SO_4$.

Hydrochloric Acid Stock Solution

The hydrochloric acid stock solution consisted of concentrated hydrochloric acid, i.e., 36 weight percent HCl.

Ammonium Citrate Stock Solution

The ammonium citrate stock solution consisted of 10 weight percent ammonium citrate in distilled water.

Using the above stock solutions, test samples were prepared and evaluated using the following protocol.

About 10 g of one of the polymer stock solutions were added to each vial. Next, sufficient volumes of the hydroquinone, hexamethylenetetramine, sulfuric acid, hydrochloric acid, and/or ammonium citrate stock solutions were added using a micropipette so that each vial contained the hydroquinone, hexamethylenetetramine, sulfuric acid, hydrochloric acid, and ammonium citrate concentrations noted below in Tables F–H. Each vial was then capped and shaken.

Test Procedure

Each sample was aged in an oven at the temperatures indicated in the following Tables F–H and, using the gel rating key shown above in Table B, periodically rated. The results of the aging tests are set forth in the following Tables F–H.

TABLE F

Gels Prepared In Tapwater Containing About 0.5 wt % Hydroquinone, About 1 wt % Hexamethylenetetramine, About 1 wt % ORP-750 Polymer and Aged at Room Temperature

TABLE F

Gels Prepared In Tapwater Containing About 0.5 wt % Hydroquinone, About 1 wt % Hexamethylenetetramine, About 1 wt % ORP-750 Polymer and Aged at Room Temperature

| | | | | Gel Ratings | | |
|---|---|---|---|---|---|---|
| | $H_2SO_4$, | HCl, | | Hours | Days | |
| Ex | wt % | wt % | pH | 5 | 2 | 5 | 7 |
| 29 | 0 | 0 | 7.5 | 1+ | 1+ | 1+ | 1+ |
| 30 | 0.5 | 0 | 4.0 | 4– | 4++ | 5– | 5/T |
| 31 | 0 | 0.5 | 1.4 | 5– | 5 | 5+ | 5+ |

The results set forth above in Table F indicate that gelation time decreases as the pH of the gel-forming composition decreases.

TABLE G

Gels prepared In Water Containing About 0.2 wt % Hexamethylenetetramine and About 1 wt % ORP-750 Polymer and Aged at 43.3° C. (110° F.)

TABLE G

Gels Prepared In Water Containing About 0.2 wt % Hexamethylenetetramine and About 1 wt % ORP-750 Polymer and Aged at 43.3° C. (110° F.)

| | | | | | Gel Ratings | | |
|---|---|---|---|---|---|---|---|
| | $H_2SO_4$, | HCl, | | | Hours | Days | Weeks |
| Ex | wt % | wt % | pH | Water | 4 | 2 | 1 | 16 |
| 32 | 0 | 0 | 7.5 | Tap$H_2O$ | 1+ | 2– | 2– | 5– |
| 33 | 0.2 | 0 | 1.4 | Tap$H_2O$ | 2+ | 4+ | 5–/T | 5–/T |
| 34 | 0 | 0.2 | 1.3 | Tap$H_2O$ | 2 | 4+ | 5–/T | 5/5% |
| 35 | 0 | 0 | 8.3 | Sea$H_2O$ | 2– | 2 | 4– | 5–/5% |
| 36 | 0.2 | 0 | 1.8 | Sea$H_2O$ | 2+ | 4++ | 5–/T | 5+/5% |
| 37 | 0 | 0.2 | 1.6 | Sea$H_2O$ | 2+ | 5– | 5 | 5/5% |

The results listed above in Table G also demonstrate that gelation time decreases as the pH of the gel-forming composition decreases.

TABLE H

Gels Prepared In Seawater Containing About 0.5 wt % Hexamethylenetetramine and About 1 wt % E-10 Polymer and Aged at 43.3° C. (110° F.)

TABLE H

Gels Prepared In Seawater Containing About 0.5 wt % Hexamethylenetetramine and About 1 wt % E-10 Polymer and Aged at 43.3° C. (110° F.)

| | | | | Gel Ratings | | | |
|---|---|---|---|---|---|---|---|
| | Bubble | $NH_4$Citrate | | Days | | Weeks | |
| Ex | $CO_2$?[1] | wt % | pH | 3 | 5 | 2 | 11 |
| 38 | No | 0 | 7.3 | 2+ | 2+ | 2+ | 2+ |
| 39 | No | 0.4 | 5.9 | 3– | 4– | 4+ | 5– |
| 40 | Yes | 0 | 5.8 | 3– | 4 | 4++ | 5/5% |

[1] When employed, carbon dioxide was bubbled for about 1 minute at a rate of about 0.17 standard cubic meters (scm) per day (6 scf/day).

The results noted in above Table H further demonstrate that gelation time decreases as the pH of the gel-forming composition decreases.

Although the present invention has been described in considerable detail with reference to some preferred versions, other versions are possible. Therefore, the spirit and scope of the appended claims should not necessarily be limited to the description of the preferred versions contained herein.

What is claimed is:

1. A method for forming a gel in at least a portion of a subterranean formation, the method comprising the step of injecting a composition into at least a portion of a subterranean formation, the composition comprising:
   (A) an ingredient selected from the group consisting of water soluble, crosslinkable polymers and polymerizable monomers capable of forming a crosslinkable polymer;
   (B) hexamethylenetetramine;
   (C) water; and
   (D) a pH reducing agent selected from the group consisting of acids, acid precursors, buffers having a buffering capacity at or below about pH 6.5, and mixtures thereof,
where a sufficient amount of the pH reducing agent is present for the composition to have a pH of about 6.5 or less.

2. The method of claim 1 where the pH reducing agent is present in the composition in a sufficient concentration for the composition to have a pH of less than about 6.

3. The method of claim 1 where the pH reducing agent is present in the composition in a sufficient concentration for the composition to have a pH of less than about 5.5.

4. The method of claim 1 where the pH reducing agent is present in the composition in a sufficient concentration for the composition to have a pH of less than about 5.

5. The method of claim 1 where the pH reducing agent is present in the composition in a sufficient concentration for the composition to have a pH of less than about 4.5.

6. The method of claim 1 where the pH reducing agent is present in the composition in a sufficient concentration for the composition to have a pH of less than about 4.

7. The method of claim 1 where the pH reducing agent is present in the composition in a sufficient concentration for the composition to have a pH of less than about 3.5.

8. The method of claim 1 where the pH reducing agent is present in the composition in a sufficient concentration for the composition to have a pH of less than about 3.

9. A method for forming a gel comprising the steps of:
   (I) decreasing the pH of an aqueous medium to less than 6.5; and
   (II) reacting, in the aqueous medium of step (I), hexamethylenetetramine and an ingredient selected from the group consisting of water soluble, crosslinkable polymers and polymerizable monomers capable of forming a crosslinkable polymer.

10. The method of claim 9 further comprising the step (III) of increasing the salinity of the aqueous medium, step (III) being performed no later than step (II).

11. A method for forming a gel comprising the steps of:
   (I) increasing the divalent cation concentration of an aqueous medium; and
   (II) reacting, in the aqueous medium of step (I), hexamethylenetetramine and an ingredient selected from the group consisting of water soluble, crosslinkable polymers and polymerizable monomers capable of forming a crosslinkable polymer.

12. The method of claim 11 further comprising the step (III) of decreasing the pH of the aqueous medium to less than 6.5, step (III) being performed no later than step (II).

13. A method for forming a gel in at least a portion of a subterranean formation, the method comprising the steps of:
   (I) injecting a composition into at least a portion of a subterranean formation, the composition comprising (A) water, (B) an ingredient selected from the group consisting of water soluble, crosslinkable polymers and polymerizable monomers capable of forming a crosslinkable polymer, and (C) a pH reducing agent; and
   (II) injecting hexamethylenetetramine into at least a portion of the subterranean formation, where a sufficient amount of the pH reducing agent is present for the composition to have a pH of about 6.5 or less.

14. The method of claim 13 where the ingredient is selected from the group consisting of hydroxypropyl guar, copolymers of acrylic acid and acrylamide, unhydrolyzed polyacrylamides, partially hydrolyzed polyacrylamides, cationic polyacrylamides, cationic denatured polyacrylamides, xanthan gum, polyvinyl alcohol, partially hydrolyzed polyvinyl acetate, and the ammonium and alkali metal salts thereof.

15. The method of claim 13 where the ingredient is selected from the group consisting of copolymers of acrylic acid and acrylamide, unhydrolyzed polyacrylamides, partially hydrolyzed polyacrylamides, cationic polyacrylamides, cationic denatured polyacrylamides, and the ammonium and alkali metal salts thereof.

16. The method of claim 13 where the pH reducing agent is selected from the group consisting of acids, acid precursors, buffers having a buffering capacity at or below about pH 6.5, and mixtures thereof.

17. The method of claim 13 where the pH reducing agent is present in the composition in a sufficient concentration for the composition to have a pH of less than about 6.

18. The method of claim 13 where the pH reducing agent is present in the composition in a sufficient concentration for the composition to have a pH of less than about 5.5.

19. The method of claim 13 where the pH reducing agent is present in the composition in a sufficient concentration for the composition to have a pH of less than about 5.

20. The method of claim 13 where the pH reducing agent is present in the composition in a sufficient concentration for the composition to have a pH of less than about 4.5.

21. The method of claim 13 where the pH reducing agent is present in the composition in a sufficient concentration for the composition to have a pH of less than about 4.

22. The method of claim 13 where the pH reducing agent is present in the composition in a sufficient concentration for the composition to have a pH of less than about 3.5.

23. The method of claim 13 where the pH reducing agent is present in the composition in a sufficient concentration for the composition to have a pH of less than about 3.

24. A method for forming a gel in at least a portion of a subterranean formation, the method comprising the step of injecting a composition into at least a portion of a subterranean formation, the composition comprising:

(A) an ingredient selected from the group consisting of water soluble, crosslinkable polymers and polymerizable monomers capable of forming a crosslinkable polymer;

(B) hexamethylenetetramine;

(C) water; and (D) a pH reducing agent, where a sufficient amount of the pH reducing agent is present for the composition to have a pH of about 6.5 or less.

25. The method of claim 24 where the ingredient is selected from the group consisting of hydroxypropyl guar, copolymers of acrylic acid and acrylamide, unhydrolyzed polyacrylamides, partially hydrolyzed polyacrylamides, cationic polyacrylamides, cationic denatured polyacrylamides, xanthan gum, polyvinyl alcohol, partially hydrolyzed polyvinyl acetate, and the ammonium and alkali metal salts thereof.

26. The method of claim 25 where the ingredient is selected from the group consisting of copolymers of acrylic acid and acrylamide, unhydrolyzed polyacrylamides, partially hydrolyzed polyacrylamides, cationic polyacrylamides, cationic denatured polyacrylamides, and the ammonium and alkali metal salts thereof.

27. The method of claim 24 where the pH reducing agent is present in the composition in a sufficient concentration for the composition to have a pH of less than about 6.

28. The method of claim 24 where the pH reducing agent is present in the composition in a sufficient concentration for the composition to have a pH of less than about 5.5.

29. The method of claim 24 where the pH reducing agent is present in the composition in a sufficient concentration for the composition to have a pH of less than about 5.

30. The method of claim 24 where the pH reducing agent is present in the composition in a sufficient concentration for the composition to have a pH of less than about 4.5.

31. The method of claim 24 where the pH reducing agent is present in the composition in a sufficient concentration for the composition to have a pH of less than about 4.

32. The method of claim 24 where the pH reducing agent is present in the composition in a sufficient concentration for the composition to have a pH of less than about 3.5.

33. The method of claim 24 where the pH reducing agent is present in the composition in a sufficient concentration for the composition to have a pH of less than about 3.

34. A recovery system comprising:

(1) a subterranean formation;

(2) a well penetrating at least a portion of the subterranean formation; and (3) a gel located in at least a portion of the subterranean formation, the gel being formed by the method of claim 24.

35. A composition comprising:

(A) an ingredient selected from the group consisting of water soluble, crosslinkable polymers and polymerizable monomers capable of forming a crosslinkable polymer;

(B) hexamethylenetetramine;

(C) water; and (D) a pH reducing agent, where a sufficient amount of the pH reducing agent is present for the composition to have a pH of about 6.5 or less.

36. The composition of claim 35 where the ingredient is selected from the group consisting of hydroxypropyl guar, copolymers of acrylic acid and acrylamide, unhydrolyzed polyacrylamides, partially hydrolyzed polyacrylamides, cationic polyacrylamides, cationic denatured polyacrylamides, xanthan gum, polyvinyl alcohol, partially hydrolyzed polyvinyl acetate, and the ammonium and alkali metal salts thereof.

37. The composition of claim 36 where the ingredient is selected from the group consisting of copolymers of acrylic acid and acrylamide, unhydrolyzed polyacrylamides, partially hydrolyzed polyacrylamides, cationic polyacrylamides, cationic denatured polyacrylamides, and the ammonium and alkali metal salts thereof.

38. A method for modifying the gelation time of a gel formed by reacting, in an aqueous reaction medium, hexamethylenetetramine and an ingredient selected from the group consisting of water soluble, crosslinkable polymers and polymerizable monomers capable of forming a crosslinkable polymer, the method comprising the step of performing the reaction in the presence of a pH reducing agent, where a sufficient amount of the pH reducing agent is present for the aqueous medium to have a pH of about 6.5 or less.

39. The method of claim 38 where the ingredient is selected from the group consisting of hydroxypropyl guar, copolymers of acrylic acid and acrylamide, unhydrolyzed polyacrylamides, partially hydrolyzed polyacrylamides, cationic polyacrylamides, cationic denatured polyacrylamides, xanthan gum, polyvinyl alcohol, partially hydrolyzed polyvinyl acetate, and the ammonium and alkali metal salts thereof.

40. The method of claim 38 where the ingredient is selected from the group consisting of copolymers of acrylic acid and acrylamide, unhydrolyzed polyacrylamides, partially hydrolyzed polyacrylamides, cationic polyacrylamides, cationic denatured polyacrylamides, and the ammonium and alkali metal salts thereof.

* * * * *

UNITED STATES PATENT AND TRADEMARK OFFICE
CERTIFICATE OF CORRECTION

PATENT NO. : 5,617,920

DATED : April 8, 1997

INVENTOR(S) : Hoai T. Dovan et al.

It is certified that error appears in the above-identified patent and that said Letters Patent is hereby corrected as shown below:

Claim 26, column 21, line 35, replace "25" with -- 24 --.

Claim 37, column 22, line 29, replace "36" with -- 35 --.

Signed and Sealed this

Tenth Day of March, 1998

Attest:

BRUCE LEHMAN

*Attesting Officer*     *Commissioner of Patents and Trademarks*